(12) United States Patent
Kubota et al.

(10) Patent No.: US 12,347,867 B2
(45) Date of Patent: Jul. 1, 2025

(54) ELECTRODE MIXTURE PRODUCTION METHOD, ELECTRODE MIXTURE, ELECTRODE, AND LITHIUM-ION BATTERY

(71) Applicant: TOYOTA JIDOSHA KABUSHIKI KAISHA, Toyota (JP)

(72) Inventors: Masaru Kubota, Okazaki (JP); Kazuki Muraishi, Toyota (JP); Aiko Nagano, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 150 days.

(21) Appl. No.: 17/945,642

(22) Filed: Sep. 15, 2022

(65) Prior Publication Data
US 2023/0088894 A1 Mar. 23, 2023

(30) Foreign Application Priority Data
Sep. 22, 2021 (JP) ................. 2021-154788

(51) Int. Cl.
| | |
|---|---|
| H01M 4/62 | (2006.01) |
| H01M 4/36 | (2006.01) |
| H01M 4/505 | (2010.01) |
| H01M 4/525 | (2010.01) |
| H01M 10/0525 | (2010.01) |
| H01M 4/02 | (2006.01) |

(52) U.S. Cl.
CPC ........... *H01M 4/628* (2013.01); *H01M 4/366* (2013.01); *H01M 2004/021* (2013.01); *H01M 4/505* (2013.01); *H01M 4/525* (2013.01); *H01M 10/0525* (2013.01)

(58) Field of Classification Search
None
See application file for complete search history.

(56) References Cited

U.S. PATENT DOCUMENTS

| | | | |
|---|---|---|---|
| 2015/0340681 A1 | 11/2015 | Iwasaki et al. | |
| 2017/0077489 A1* | 3/2017 | Uchiyama | ............. C01G 53/50 |
| 2017/0162856 A1 | 6/2017 | Uchiyama | |
| 2018/0323435 A1 | 11/2018 | Lim et al. | |
| 2019/0198870 A1 | 6/2019 | Watano et al. | |
| 2023/0074059 A1 | 3/2023 | Kwak et al. | |

FOREIGN PATENT DOCUMENTS

| | | |
|---|---|---|
| JP | 6269645 B2 | 1/2018 |
| JP | 6281545 B2 | 2/2018 |
| JP | 2020-009756 A | 1/2020 |
| KR | 2018-0123369 A | 11/2018 |

* cited by examiner

*Primary Examiner* — Tanisha Diggs
(74) *Attorney, Agent, or Firm* — Dinsmore & Shohl LLP

(57) ABSTRACT

Disclosed is a method in which both the suppression of granulation of an active material and the acceleration of production steps are achieved when producing an electrode mixture containing a coated active material. The method comprises dropletizing a slurry containing an active material and a coating liquid to obtain slurry droplets, gas-flow drying the slurry droplets in a heating gas to obtain a first and a second precursor, and firing the first and the second precursor to obtain a first and second particle, wherein the first precursor contains the active material and a component from the coating liquid, the second precursor is free of the active material and contains a component from the coating liquid, the first particle has the active material and a coating layer, and the second particle is free of the active material and contains a component same as that constituting the coating layer.

6 Claims, 6 Drawing Sheets

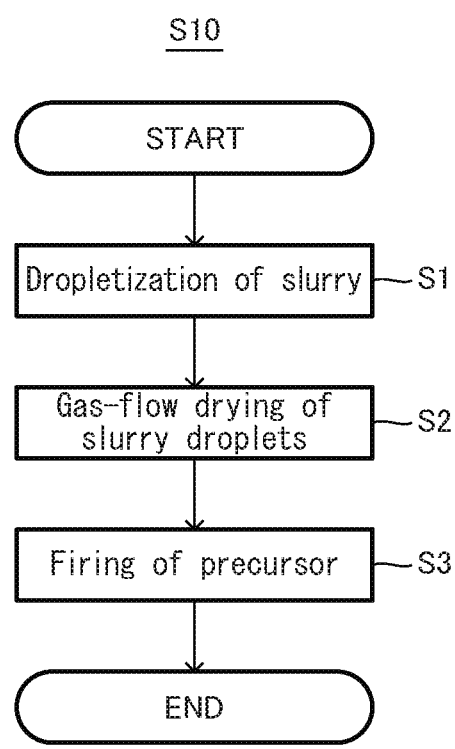

ELECTRODE MIXTURE PRODUCTION METHOD, ELECTRODE MIXTURE, ELECTRODE, AND LITHIUM-ION BATTERY

CROSS-REFERENCE TO RELATED APPLICATION

This application claims priority to Japanese Patent Application No. 2021-154788 filed on Sep. 22, 2021, incorporated herein by reference in its entirety.

FIELD

The present application discloses a method for producing an electrode mixture, an electrode mixture, an electrode, and a lithium-ion cell.

BACKGROUND

Patent Literature 1 discloses a method for producing an active material composite (coated active material), wherein a specific coating liquid is sprayed onto and dried on the surface of an active material using a tumbling fluidized bed coating device, and then fired

CITATION LIST

Patent Literature

[PTL 1] Japanese Patent Publication No. 6269645

SUMMARY

Technical Problem

In the method disclosed in Patent Literature 1, when the coating liquid is sprayed onto an active material at a high rate, granulation of the active material occurs easily. When an electrode or a battery is configured using a granulated active material, for example, the resistance of the electrode or the battery may increase. On the other hand, when the coating liquid is sprayed at a low rate to suppress the granulation of the active material, a long time is required to produce the coated active material. As such, it is difficult to achieve both the suppression of granulation of the active material and the acceleration of the production steps in the prior art.

Solution to Problem

As one way to solve the above problem, the present application discloses
a method for producing an electrode mixture, comprising
dropletizing a slurry containing an active material and a coating liquid to obtain slurry droplets;
gas-flow drying the slurry droplets in a heating gas to obtain a first precursor and a second precursor; and
firing the first precursor and the second precursor to obtain a first particle and a second particle, wherein
the first precursor contains the active material and a component from the coating liquid,
the second precursor is free of the active material and contains a component from the coating liquid,
the first particle has the active material and a coating layer covering at least a portion of a surface of the active material, and
the second particle is free of the active material and contains a component same as that constituting the coating layer.

In the method of the present disclosure, the temperature of the heating gas may be 250° C. or higher.

In the method of the present disclosure, the slurry droplets may be obtained by spraying the slurry.

In the method of the present disclosure, the coating liquid may contain at least a lithium source and a niobium source.

In the method of the present disclosure, the coating liquid may contain a niobium peroxo complex as the niobium source.

The method of the present disclosure may comprise mixing at least the first particle, the second particle, and a solid electrolyte.

As one way to solve the above problem, the present application discloses
an electrode mixture, comprising at least a first particle and a second particle, wherein
the first particle has an active material and a coating layer covering at least a portion of a surface of the active material, and
the second particle is free of the active material and contains a component same as that constituting the coating layer.

In the electrode mixture of the present disclosure, the roundness of a cross-section of the second particle may be 0.30 or greater and 1.00 or less.

In the electrode mixture of the present disclosure, the coating layer may contain at least lithium and niobium as constituent elements.

The electrode mixture of the present disclosure may contain at least the first particle, the second particle, and a solid electrolyte.

As one way to solve the above problem, the present application discloses
an electrode, comprising a layer composed of the electrode mixture of the present disclosure.

In the electrode of the present disclosure, a second particle ratio may account for 0.02% by area or more of the layer when a cross-section of the layer is observed.

As one way to solve the above problem, the present application discloses
a lithium-ion battery, comprising the electrode of the present disclosure.

Effects

According to the method of the present disclosure, the suppression of granulation of an active material and the acceleration of the production steps are both easily achieved. By configuring an electrode or a battery using the electrode mixture of the present disclosure, for example, an electrode or a battery having low resistance is easily obtained.

BRIEF DESCRIPTION OF DRAWINGS

FIG. 1 shows an example of the flow of a method for producing an electrode mixture.

DESCRIPTION OF EMBODIMENTS

1. Production Method of Electrode Mixture

Figure 2A:
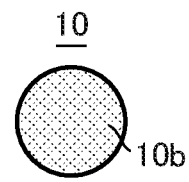
FIG. 2A schematically shows an example of a slurry droplet.

As shown in FIGS. 1 to 5, the method S10 for producing an electrode mixture according to one embodiment comprises
- step S1: dropletizing a slurry containing an active material 10a and a coating liquid 10b to obtain slurry droplets 10;
- step S2: gas-flow drying the slurry droplets 10 in a heating gas to obtain a first precursor 21 and a second precursor 22; and
- step S3: firing the first precursor 21 and the second precursor 22 to obtain a first particle 31 and a second particle 32. The first precursor 21 contains the active material 10a and a component 10c from the coating liquid 10b, the second precursor 22 is free of the active material 10a and contains the component 10c from the coating liquid 10b, the first particle 31 has the active material 10a and a coating layer 10d covering at least a portion of the surface of the active material 10a, and the second particle 32 is free of the active material 10a and contains the same component as that constituting the coating layer 10d.

1.1 Step S1

As shown in FIGS. 2A to 2D, in the step S1, the slurry containing the active material 10a and the coating liquid 10b is dropletized to obtain slurry droplets 10.

1.1.1 Active Material

The active material may be a positive electrode active material, or may be a negative electrode active material. Specific examples of the active material include lithium-containing oxides such as $LiCoO_2$, $LiNi_xCo_{1-x}O_2$ ($0<x<1$), $LiNi_{1/3}Co_{1/3}Mn_{1/3}O_2$, $LiMnO_2$, dissimilar-element substituted Li—Mn spinels ($LiMn_{1.5}Ni_{0.5}O_4$, $LiMn_{1.5}Al_{0.5}O_4$, $LiMn_{1.5}Mg_{0.5}O_4$, $LiMn_{1.5}Co_{0.5}O_4$, $LiMn_{1.5}Fe_{0.5}O_4$, $LiMn_{1.5}Zn_{0.5}O_4$ and etc.), lithium titanates (for example, $Li_4Ti_5O_{12}$), and lithium metal phosphates ($LiFePO_4$, $LiMnPO_4$, $LiCoPO_4$, $LiNiPO_4$ and etc.); various oxide-based active materials other than lithium-containing oxides; Si-based active materials such as Si and Si alloys; carbon-based active materials such as graphite and hard carbon; and metallic lithium and lithium alloys. Among these, substances having a relatively high charge/discharge potential can be used as a positive electrode active material, and substances having a relatively low charge/discharge potential can be used as a negative electrode active material. In particular, when the active material is a lithium-containing oxide, a greater effect can be exhibited by the method of the present disclosure. One type of active material may be used alone, or two or more types may be mixed and used. The active material may be one which is used in sulfide all-solid-state batteries.

The shape of the active material is not particularly limited as long as the slurry can be dropletized. For example, the active material may be in the form of particles. The active material particles may be solid particles or hollow particles. The active material particles may be primary particles or secondary particles in which a plurality of primary particles are aggregated. The average particle diameter (D50) of the active material particles may be, for example, 1 nm or more, 5 nm or more, or 10 nm or more, and may be 500 μm or less, 100 μm or less, 50 μm or less, or 30 μm or less. It should be noted that the average particle diameter D50 is the particle diameter (median size) at an integrated value of 50% in a volume-based particle diameter distribution obtained by the laser diffraction/scattering method.

1.1.2 Coating Liquid

A coating layer on the surface of the active material can be formed by a component from the coating liquid. The second precursor and the second particle, which are described later, can be composed of a component from the coating liquid. The coating layer may have, for example, a function of suppressing an increase in interfacial resistance between the active material and another substance. The type of coating liquid can be selected in accordance with the type of the active material to be coated and the desired function of the coating layer.

When the surface of the active material is provided with a layer composed of an oxide containing lithium and an element A other than lithium, the coating liquid may contain a lithium source and an A source. Specific examples of the element A include at least one selected from the group consisting of B, C, Al, Si, P, S, Ti, Zr, Nb, Mo, Ta, and W. For example, when the surface of the active material is provided with a lithium niobate layer as the coating layer, the coating liquid can contain at least a lithium source and a niobium source. From the viewpoint of further enhancing the performance of the coating layer, the coating liquid may contain at least one of a phosphorus source and a boron source, in addition to the lithium source and the niobium source. Alternatively, at least one of the phosphorus source and the boron source may be contained in place of the niobium source. For example, by substituting a portion of Nb of the lithium niobate with P (alternatively, doping the lithium niobate with P), the withstand voltage characteristic of the coating layer is easily improved. The coating liquid may contain lithium ions as a lithium source. For example, by dissolving a lithium compound such as LiOH, $LiNO_3$, and/or $Li_2SO_4$ in a solvent, a coating liquid containing lithium ions as a lithium source may be obtained. Alternatively, the coating liquid may contain lithium alkoxide as a lithium source. Further, the coating liquid may contain a niobium peroxo complex as a niobium source. Alternatively, the coating liquid may contain niobium alkoxide as a niobium source. Particularly, when the coating liquid contains a niobium peroxo complex as a niobium source, high performance is easily obtained. The molar ratio of the lithium source to the niobium source contained in the coating liquid is not particularly limited. For example, the molar ratio Li/Nb may be 0.5 or greater or 0.8 or greater, and may be 2.0 or less or 1.5 or less. Hereinafter, (i) a coating liquid containing lithium ions and a niobium peroxo complex and (ii) a coating liquid containing lithium alkoxide and niobium alkoxide will be exemplified.

(i) Coating Liquid Containing Lithium Ions and Niobium Peroxo Complex

The coating liquid may be obtained, for example, by preparing a transparent solution using, for example, a hydrogen peroxide solution, niobate, and aqueous ammonia, and thereafter adding a lithium compound to the transparent solution. The structural formula of the niobium peroxo complex ($[Nb(O_2)_4]^{3-}$) is, for example, as follows.

[Chem. 1]

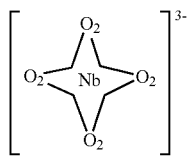

(ii) Coating Liquid Containing Lithium Alkoxide and Niobium Alkoxide

The coating liquid may be obtained, for example, by dissolving an ethoxylithium powder in a solvent and then adding a predetermined amount of pentaethoxyniobium thereto. In this case, examples of the solvent include dehydrated ethanol, dehydrated propanol, and dehydrated butanol.

The coating layer provided on the surface of the active material by a component from the coating liquid is not limited to a layer composed of an oxide containing lithium and an element A other than lithium. The method of the present disclosure can be used when the surface of the active material is modified or coated with some substance. For example, the method of the present disclosure can be used even when coating the surface of a positive or negative electrode active material with a transition metal oxide in order to increase the output or lifespan thereof. However, it is considered that the method of the present disclosure demonstrates a particularly remarkable effect when the surface of the active material is provided with a layer composed of an oxide containing lithium and an element A other than lithium.

1.1.3 Slurry

The term "slurry" may refer to a suspension or dispersion containing an active material and a coating liquid, and may have a fluidity sufficient to be dropletized. In the method of the present disclosure, the slurry may have a fluidity sufficient to be dropletized using, for example, a spray nozzle or a rotary atomizer. The slurry may contain some solid components or liquid components in addition to the active material and coating liquid described above.

The solid content concentration of the slurry may be determined in accordance with the type of active material, the type of coating liquid, and the conditions of dropletization (such as the apparatus used for dropletization). The solid content concentration of the slurry is not particularly limited. The solid content concentration may be, for example, 1 vol % or more, 5 vol % or more, 10 vol % or more, 20 vol % or more, 25 vol % or more, 30 vol % or more, 35 vol % or more, 40 vol % or more, 45 vol % or more, or 50 vol % or more, and may be 70 vol % or less, 65 vol % or less, 60 vol % or less, 55 vol % or less, 50 vol % or less, 45 vol % or less, 40 vol % or less, 35 vol % or less, 30 vol % or less, 25 vol % or less, or 20 vol % or less. From the viewpoint of obtaining slurry droplets more easily, the solid content concentration of the slurry may be 1 vol % or more or 5 vol % or more, and may be 40 vol % or less, 35 vol % or less, 30 vol % or less, 25 vol % or less, or 20 vol % or less.

1.1.4 Dropletization of Slurry

"Dropletization" of the slurry means changing the slurry containing the active material and the coating liquid into droplets containing the active material and the coating liquid (first droplets) and droplets free of the active material and containing the coating liquid (second droplets).

The method for dropletizing the slurry containing the active material and the coating liquid is not particularly limited. For example, slurry droplets may be obtained by spraying the slurry. When spraying the slurry, a spray nozzle may be used. Examples of the method of spraying the slurry using a spray nozzle include, but are not limited to, a pressurized nozzle method and a two-fluid nozzle method.

When spraying the slurry using a spray nozzle, the nozzle diameter is not particularly limited. The nozzle diameter may be, for example, 0.1 mm or more, 0.5 mm or more, or 1 mm or more, and may be 10 mm or less, 5 mm or less, or 1 mm or less.

The spray speed of the slurry (the supply speed (feed speed) of the slurry to the spray nozzle) is also not particularly limited. The spray speed may be adjusted in accordance with the viscosity and solid content concentration of the slurry and the nozzle dimensions. The spray speed may be, for example, 0.1 g/s or more, 0.5 g/s or more, or 1.0 g/s or more, and may be 5.0 g/s or less, 3.5 g/s or less, or 2.0 g/s or less. According to new findings from the present inventors, when the spray speed is high, the second precursor and the second particle, which are described later, are easily generated.

In addition to a method of spraying the slurry using a spray nozzle as described above, examples of the method for dropletizing the slurry also include a method of supplying the slurry containing the active material and the coating liquid onto a rotating disk at a constant rate to dropletize the slurry by centrifugal force. In this case, the supply speed of the slurry may also be, for example, 0.1 g/s or more, 0.5 g/s or more, or 1.0 g/s or more, and may be 5.0 g/s or less, 3.5 g/s or less, or 2.0 g/s or less. The supply speed may be adjusted in accordance with the viscosity and solid content concentration of the slurry and the nozzle dimensions. Alternatively, a method of applying a high voltage to the surface of the slurry containing the active material and the coating liquid to dropletize the slurry can be adopted.

In the method of the present disclosure, dropletizing the slurry (step S1) and gas-flow drying (step S2) may be carried out, for example, using a spray dryer. The method (system) of the spray dryer is not particularly limited, and examples thereof include the method (system) using the spray nozzle and the method (system) using a rotating disk described above.

1.1.5 Slurry Droplets

As described above, "slurry droplets" may include droplets containing the active material and the coating liquid (first droplets) and droplets consisting of the coating liquid (second droplets). The size of the slurry droplets is not particularly limited. The diameter (equivalent circular diameter) of the first droplets may be, for example, 0.1 μm or more, 0.5 μm or more, 5.0 μm or more, and may be 5000 μm or less, 1000 μm or less, or 500 μm or less. The diameter (equivalent circular diameter) of the second droplets may be, for example, 0.1 μm or more, 0.5 μm or more, or 5.0 μm or more, and may be 1000 μm or less, 500 μm or less, or 50 μm or less. The diameter of the slurry droplets can be measured using, for example, a two-dimensional image obtained by imaging the slurry droplets or can be measured using a laser diffraction particle diameter distribution meter. Alternatively, the droplet diameter can be estimated from the operating conditions of the apparatus for forming the slurry droplets.

In the method of the present disclosure, each slurry droplet, for example, may consist of only the coating liquid, may contain one active material particle and the coating liquid attached thereto, or may contain a plurality of active material particles (particle group) and the coating liquid attached thereto. An example of the forms of slurry droplets is shown below.

As shown in FIG. 2A, the slurry droplet 10 may be free of an active material 10a and consist of a coating liquid 10b.

Figure 2B:
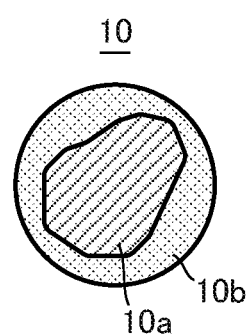
FIG. 2B schematically shows an example of a slurry droplet.

As shown in FIG. 2B, the slurry droplet 10 may contain one active material particle 10a and a coating liquid 10b attached thereto. The coating liquid 10b may cover the entire surface of the active material particle 10a.

Figure 2C:
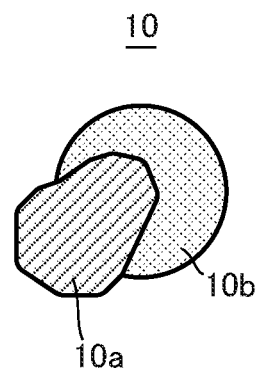
FIG. 2C schematically shows an example of a slurry droplet.

As shown in FIG. 2C, the slurry droplet 10 may contain one active material particle 10a and a coating liquid 10b attached thereto. The coating liquid 10b may cover a portion of the surface of the active material particle 10a.

Figure 2D:
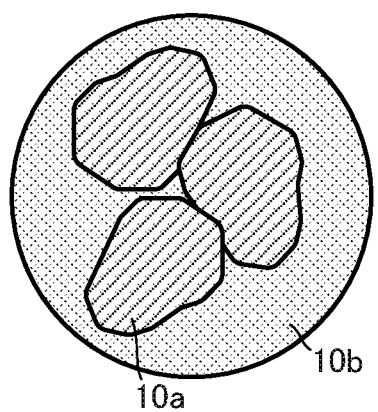
FIG. 2D schematically shows an example of a slurry droplet.

As shown in FIG. 2D, the slurry droplet 10 may contain a plurality of active material particles 10a and a coating liquid 10b attached thereto. The coating liquid 10b may cover all or a portion of the surfaces of the plurality of active material particles 10a.

1.2 Step S2

Figure 3:
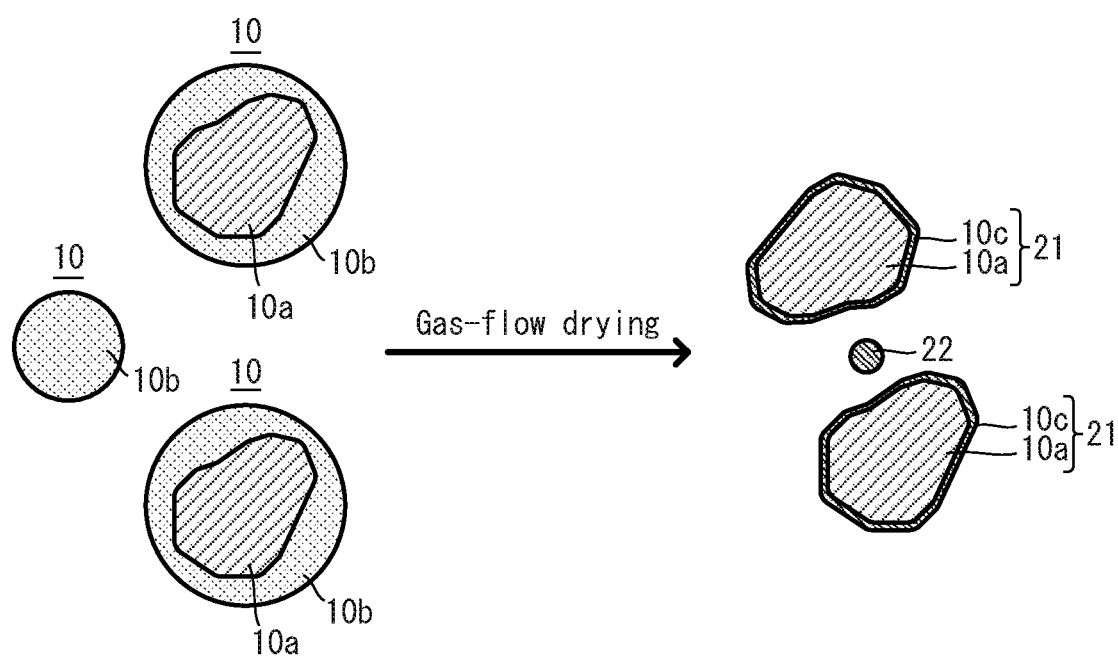
FIG. 3 schematically shows an example of gas-flow drying.

As shown in FIG. 3, in the step S2, the slurry droplets 10 obtained in the step S1 are subjected to gas-flow drying in a heating gas to obtain a first precursor 21 and a second precursor 22. The "first precursor" is a precursor of a first particle (coated active material) described later, and the "second precursor" is a precursor of a second particle described later. As shown in FIG. 3, the first precursor 21 contains the active material 10a and a component 10c from the coating liquid, and the second precursor 22 is free of the active material 10a and contains the component 10c from the coating liquid.

1.2.1 Gas-Flow Drying Conditions

"Gas-flow drying" in the method of the present disclosure means that the slurry droplets are dried while being floated in a high-temperature gas flow. The "gas-flow drying" can include not only drying but also ancillary operations using dynamic gas flow. By continuously applying hot gas to the slurry droplets or the precursors by gas-flow drying, a force is continuously applied to the slurry droplets or the precursors. Using this, the step S2 may comprise deagglomerating (crushing) the slurry droplets or the precursors by gas-flow drying.

Figure 4A:
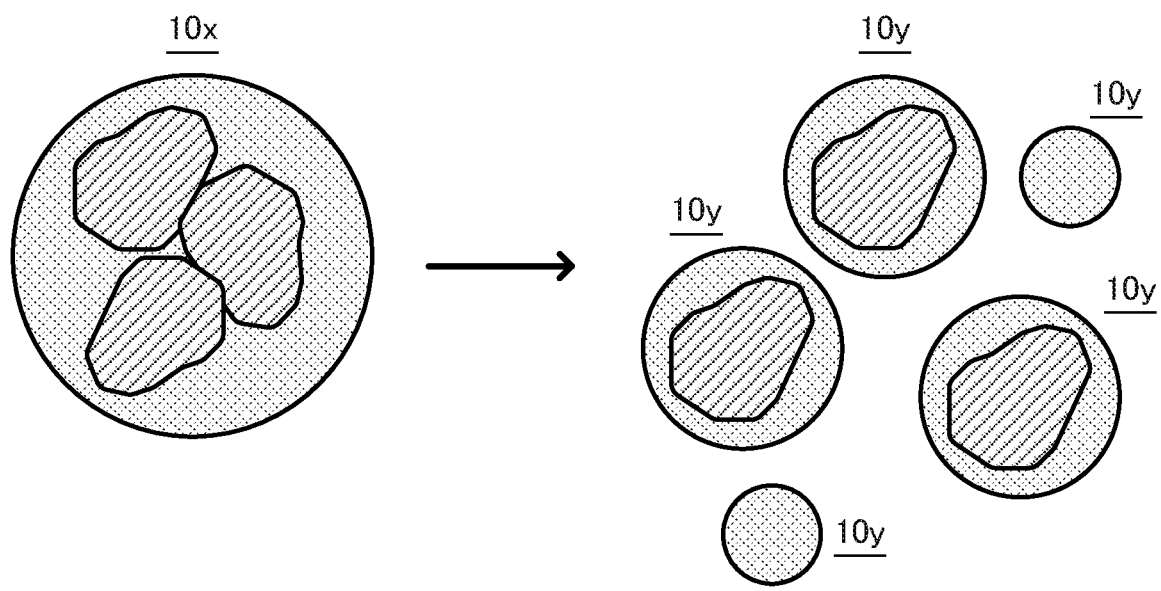
FIG. 4A schematically shows an example of an effect of gas-flow drying.
Figure 4B:
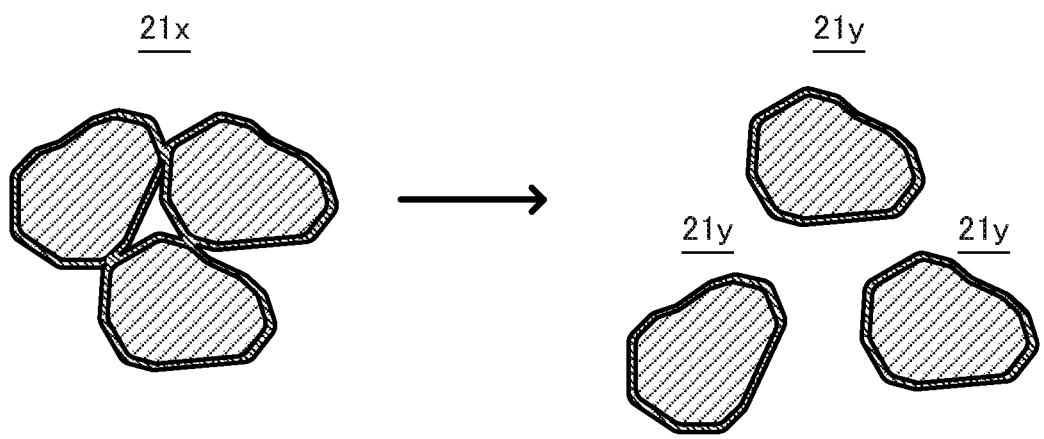
FIG. 4B schematically shows an example of an effect of gas-flow drying.

Specifically, as shown in FIG. 4A, when gas-flow drying the slurry droplets, one slurry droplet 10x may be crushed for each active material particle or each active material particle group to obtain a plurality of slurry droplets 10y, or as shown in FIG. 4B, one agglomerated first precursor 21x may be crushed for each active material particle or each active material particle group to obtain a plurality of first precursors 21y. In other words, in the method of the present disclosure, even when granulation of the first precursors or the first particles occurs, a portion of the granules can be crushed by the gas-flow drying, in addition to the granulation of the first precursors or the first particles being suppressed by the presence of the second precursors or the second particles. In this regard, in the method of the present disclosure, a slurry having a low solid content concentration which may cause granulation or agglomeration can be used, and the processing speed in the production of the coated active material (first particle) is easily increased. In the step S2, by crushing the slurry droplets and the precursors by gas-flow drying, the production time is easily shortened, and a coated active material (first particle) having higher performance is easily produced.

In the step S2, the above drying and crushing may be carried out simultaneously or separately. In the step S2, a first gas-flow drying in which predominantly the slurry droplets are dried and a second gas-flow drying in which predominantly the precursors are crushed may be carried out. In addition, the step S2 may be repeated.

In the step S2, the temperature of the heating gas may be any temperature as long as the solvent can be volatilized from the slurry droplets. The temperature may be, for example, 100° C. or higher, 110° C. or higher, 120° C. or higher, 130° C. or higher, 140° C. or higher, 150° C. or higher, 160° C. or higher, 170° C. or higher, 180° C. or higher, 190° C. or higher, 200° C. or higher, 210° C. or higher, 220° C. or higher, 230° C. or higher, 240° C. or higher, or 250° C. or higher. According to new findings from the present inventors, when the heating gas is at a high temperature, for example, at 250° C. or higher, larger amounts of the second precursors and the second particles are easily generated, and agglomeration and granulation of the first precursors and the first particles are more easily suppressed. Whether or not a surface of the active material is covered with the coating liquid is considered to change significantly depending on the surface energy of the coating liquid. By setting the heating gas to a high temperature, the temperature of the coating liquid becomes high, the surface energy of the coating liquid changes significantly, and the amount of the coating liquid that can be fixed to the surface of the active material may decrease.

In the step S2, the gas supply amount (flow rate) of the heating gas can be appropriately set in consideration of the size of the apparatus used and the supply amount of the slurry droplets. For example, the flow rate of the heating gas may be 0.10 m$^3$/min or more, 0.15 m$^3$/min or more, 0.20 m$^3$/min or more, 0.25 m$^3$/min or more, 0.30 m$^3$/min or more, 0.35 m$^3$/min or more, 0.40 m$^3$/min or more, 0.45 m$^3$/min or more, or 0.50 m$^3$/min or more, and may be 5.00 m$^3$/min or less, 4.00 m$^3$/min or less, 3.00 m$^3$/min or less, 2.00 m$^3$/min or less, or 1.00 m$^3$/min or less.

In the step S2, the gas supply speed (flow velocity) of the heating gas can also be appropriately set in consideration of the size of the apparatus used and the supply amount of the slurry droplets. For example, the flow velocity of the heating gas in at least a portion of the system may be 1 m/s or more or 5 m/s or more, and may be 50 m/s or less or 10 m/s or less.

In the step S2, the treatment time (drying time) by gas-flow drying can also be appropriately set in consideration of the size of the apparatus used and the supply amount of the slurry droplets. For example, the treatment time may be 5 s or less or 1 s or less.

In the step S2, a heating gas that is substantially inert to the active material and the coating liquid may be used. For example, an oxygen-containing gas such as air, an inert gas such as nitrogen or argon, or dry air having a low dew point can be used. The dew point in that case may be −10° C. or lower or −50° C. or lower, or may be −70° C. or lower.

As the apparatus for gas-flow drying, for example, a spray dryer can be used, but the apparatus is not limited thereto.

1.2.2 First Precursor

The first precursor contains the active material and a component from the coating liquid. Specifically, in the first precursor, at least a portion of the surface of the active material is covered with the component from the coating liquid. The details of the active material and the component contained in the coating liquid are as described above. The amount of the component from the coating liquid attached to the active material is not particularly limited, and may be appropriately adjusted in accordance with the desired thickness of the coating layer.

1.2.3 Second Precursor

The second precursor is free of an active material and contains a component from the coating liquid. As described above, when the slurry droplets are subjected to gas-flow drying, a portion of the coating liquid is easily dried/condensed without attaching to the active material caused by "excess liquid". Specifically, the second precursor is formed by condensing/drying the coating liquid independently of the active material during the gas-flow drying of the slurry droplets. The second precursor does not contain an active material, and is thus easily made smaller than the first precursor, and easily made into a sphere as described later. As such, by generating the first precursor together with the second precursor in the method of the present disclosure, granulation of the first precursors is easily suppressed, and ultimately a fine first particle (coated active material) is easily obtained.

1.3 Step S3

Figure 5:
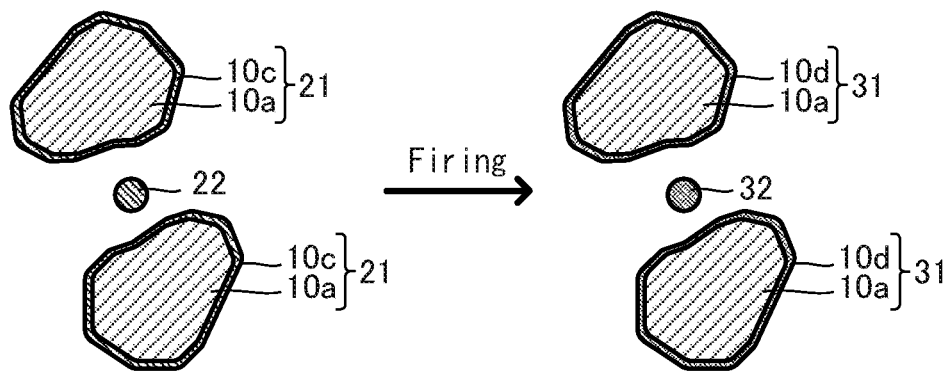
FIG. 5 schematically shows an example of a particle obtained by firing a precursor.

As shown in FIG. 5, in the step S3, the first precursor 21 and the second precursor 22 obtained in the step S2 are fired. Consequently, a first particle 31 and a second particle 32 are obtained. As shown in FIG. 5, the first particle 31 has the active material 10a and a coating layer 10d covering at least a portion of the surface of the active material 10a. That is, the first particle 31 is a coated active material. As described above, the coating layer 10d of the first particle 31 contains a component from the coating liquid 10b. On the other hand, the second particle 32 is free of the active material 10a and contains the same component as that constituting the above coating layer 10d. In other words, the second particle 32 also contains a component from the coating liquid 10b.

1.3.1 Firing Conditions

In the firing of the precursors, for example, a muffle furnace or a hot plate may be used. Alternatively, the precursors can be fired in the gas-flow drying described above. Specifically, by subjecting the slurry droplets to gas-flow drying and turning the slurry droplets into precursors in the step S2 and further keeping the precursors heated in a gas flow, the firing of the precursors according to step S3 may be performed. The firing conditions (firing temperature, firing time, firing atmosphere and etc.) are not particularly limited, and can be appropriately adjusted in accordance with the type of the first particle, which is a coated active material. The firing temperature may be, for example, 100° C. or higher, 150° C. or higher, 180° C. or higher, 200° C. or higher, or 230° C. or higher, and may be 350° C. or lower, 300° C. or lower, or 250° C. or lower. The firing temperature of the step S3 may be higher or lower than the gas-flow drying temperature of the step S2, or may be the same as the gas-flow drying temperature. The firing time may be, for example, 1 h or more, 2 h or more, 3 h or more, 4 h or more, 5 h or more, or 6 h or more, and may be 20 h or less, 15 h or less, or 10 h or less. The firing atmosphere may be, for example, an air atmosphere, a vacuum atmosphere, a dry air atmosphere, a nitrogen gas atmosphere, or an argon gas atmosphere.

1.3.2 First Particle (Coated Active Material)

The first particle is obtained by firing the first precursor. The details of the active material constituting the first particle are as described above. The first particle has a coating layer, and the coating layer contains a component from the coating liquid. The thickness of the coating layer of the first particle is not particularly limited. The thickness may be, for example, 0.1 nm or more, 0.5 nm or more, or 1 nm or more, and may be 500 nm or less, 300 nm or less, 100 nm or less, 50 nm or less, or 20 nm or less. Further, the coating layer may cover 70% or more or 90% or more of the surface of the active material. It should be noted that the coverage rate of the coating layer on the active material surface can be calculated by observation with scanning electron microscope (SEM) images of a particle cross-section, or can be calculated by calculating the element ratio of the surface by X-ray photoelectron spectroscopy (XPS).

The particle diameter (D90) of the first particle is not particularly limited. The particle diameter may be, for example, 1 nm or more, 10 nm or more, 100 nm or more, 1 μm or more, 2 μm or more, 3 μm or more, 4 μm or more, 5 μm or more, 6 μm or more, 7 μm or more, 8 μm or more, or 9 μm or more, and may be 50 μm or less, 30 μm or less, 20 μm or less, or 10 μm or less. It should be noted that the particle diameter D90 is a particle diameter at an integrated value of 90% in a volume-based particle diameter distribution determined by a laser diffraction/scattering method.

In the first particle, the coating layer may be provided with a plurality of vacancies. The vacancies may be, for example, pores, cavities, voids, or gaps. The shape of each vacancy is not particularly limited. For example, the cross-sectional shape of each vacancy may be circular or elliptical. The size of each vacancy is not particularly limited. For example, when the cross-section of the first particle is observed, the equivalent circular diameter of a vacancy may be 10 nm or more and 300 nm or less. The number of vacancies in the coating layer is not particularly limited. The position of the vacancies in the coating layer is also not particularly limited. The vacancies may be present at the interface between the active material and the coating layer, or may be present within the coating layer. The coating layer may have a plurality of vacancies contained inside (active material side) than on the outermost surface thereof (the surface opposite to the active material).

In the first particle, by providing the coating layer with a plurality of vacancies, the following effect can be expected. For example, contact between the first particle and another battery material may be advantageous and the movement of electrons and ions may be promoted. In addition, the first particle may exhibit a cushioning characteristic, and consequently, the performance when used as an electrode or a battery may be improved. For example, when the active material expands during charging and discharging, or when pressure is applied to the coated active material during electrode pressing, it is considered that the above cushioning characteristic reduces the stress applied to the active material and suppresses cracking of the active material.

Examples of a method for forming a plurality of vacancies in the coating layer include the following methods. That is, in the method of the present disclosure described above, dropletization and gas-flow drying of the slurry may be carried out using a spray dryer. In this case, quick drying, which is a feature of the spray dryer, causes desorption of components contained in the slurry (coating solution and active material) and formation of a film almost simultaneously. Specifically, since the shape of the film changes significantly under the influence of the physical force received when the components are desorbed, and the film hardens under such an influence, it is considered that the plurality of vacancies are formed in the coating layer as described above. This phenomenon is considered to occur in the same manner even if the type of coating liquid contained in the slurry is changed. Particularly, it is expected that the phenomenon occurs predominantly when a low boiling point solvent such as water (solvent accompanied by rapid vaporization in the drying process) is used.

The first particle obtained after firing in the step S3 has a coating layer, and thus tends to be larger than the active material used in the step S1. On the other hand, as described above, granulation of the first precursors or the first particles is easily suppressed in the method of the present disclosure due to the presence of the second precursors or the second particles and thus, it is difficult for the particle size of the first particle to be excessively large. For example, the particle diameter (D90) of the mixture of the first particles and the second particles obtained in the step S3 may be 1.10 times or greater the particle size (D90) of the active material used in the step S1, and may be 1.50 times or less, 1.40 times or less, or 1.30 times or less.

1.3.3 Second Particle

The second particle is obtained by firing the second precursor. The second particle differs from the first particle in that the second particle does not contain an active material. The second particle contains the same component as that contained in the coating layer of the first particle. In other words, the second particle contains a component from the coating liquid. In the method of the present disclosure, granulation of the first precursors or the first particles is suppressed due to the presence of the second precursors or the second particles, and ultimately a fine first particle as a coated active material is easily obtained. It is considered that the larger the amount of the second precursor with respect to the first precursor, and in turn the larger the amount of the second particle with respect to the first particle, the more suppressed the granulation of the first precursors and the first particles is. The amount of the second precursor with respect to the first precursor and the amount of the second particle with respect to the first particle can be adjusted by changing the temperature (gas supply temperature) of the heating gas or the spray speed (liquid feed speed) in the step 2, as described above. Specifically, the higher the temperature of the heating gas and the higher the spray speed, the larger the amounts of the second precursors and the second particles are generated. The ratio of the first particles to the second particles is not particularly limited. For example, using the total of the first particles and the second particles as a reference (100% by volume), the second particles may account for 0.1% by volume or more or 1% by volume or more, and may account for 10% by volume or less or 5% by volume or less. It should be noted that the ratio of the first particles to the second particles can be calculated from SEM images of the electrode mixture containing the first particle and the second particle.

The second particle does not contain an active material, and is thus naturally smaller than the first particle. The particle diameter (D90) of the second particle is not particularly limited. The particle diameter may be, for example, 1 nm or more, 10 nm or more, 100 nm or more, or 300 nm or more, and may be 10 μm or less, 8 μm or less, 5 μm or less, or 3 μm or less.

The second particle is obtained, for example, by volatilizing the solvent from slurry droplets substantially free of a solid content such as the active material and condensing the slurry droplets to obtain a second precursor, and then further firing the second precursor. That is, a sphere, which is a stable shape for a droplet, is maintained at the slurry droplet stage, and the spherical droplet can be condensed as it is to obtain a second precursor and a second particle. In this regard, the shape of the second precursor and the second particle may be of a spherical shape. Specifically, the roundness (circularity) of the cross-section of the second particle may be 0.30 or greater or 0.35 or greater, and may be 1.00 or less or 0.85 or less. The formula for the roundness (circularity) of the cross-section of the second particle will be described later.

1.4 Specific Examples of Steps S1 to S3

The production of a coated active material having a coating layer containing lithium niobate on the surface of a positive electrode active material will be exemplified. For example, using particles of a lithium-containing oxide as a positive electrode active material and a solution (for example, an aqueous solution) containing lithium ions and a niobium peroxo complex as a coating liquid, the steps S1 and S2 described above are carried out to obtain a first precursor and a second precursor. In the first precursor, lithium and niobium from the coating liquid are attached to the surface of the positive electrode active material. In addition, the second precursor contains lithium and niobium from the coating liquid. By firing the first precursor and the second precursor, a coated active material as a first particle and a second particle are obtained. Specifically, a first particle (coated active material), in which a coating layer containing lithium niobate is formed on the surface of a lithium-containing oxide as a positive electrode active material, and a second particle containing lithium niobate are obtained.

1.5 Additional Step

Through the above steps S1 to S3, an electrode mixture containing at least the first particle and the second particle is obtained. The electrode mixture may contain any additional component in addition to the first particle and the second particle in accordance with the application of the electrode mixture. For example, when obtaining an electrode mixture for solid-state battery (battery using a solid electrolyte), the method of the present disclosure may comprise mixing at least the first particle, the second particle, and a solid electrolyte, or may comprise mixing at least the first particle, the second particle, a solid electrolyte, a conductive aid, and a binder. The content of the first particle in the electrode mixture is not particularly limited, and may be, for example, 40% by mass or more and 99% by mass or less. In addition, the content of the second particle in the electrode mixture is not particularly limited, and may be, for example, 1.0% by mass or less, 0.5% by mass or less, or 0.1% by mass or less. The first particle, the second particle, and the additional component may be dry-mixed, or may be wet-mixed using an organic solvent (in some embodiments a non-polar solvent).

1.5.1 Solid Electrolyte

A publicly known solid electrolyte may be used. For example, an oxide solid electrolyte such as a perovskite-type, NASICON-type, or garnet-type Li-containing oxide or a sulfide solid electrolyte containing Li and S as constituent elements can be used. Particularly, when a sulfide solid electrolyte is used, a greater effect due to the technique of the present disclosure can be expected. Specific examples of the sulfide solid electrolyte include, but are not limited to, LiI—LiBr—$Li_3PS_4$, $Li_2S$—$SiS_2$, LiI—$Li_2S$—$SiS_2$, LiI—$Li_2S$—$P_2S_5$, LiI-$LI_2O$—$Li_2S$—$P_2S_5$, LiI—$Li_2S$—$P_2O_5$, LiI—$Li_3PO_4$—$P_2S_5$, $Li_2S$—$P_2S_5$, $Li_3PS_4$, and $Li_2S$—$P_2S_5$—$GeS_2$. The solid electrolyte may be amorphous or crystalline. One type of solid electrolyte may be used alone, or two or more types may be mixed and used.

1.5.2 Conductive Aid

Specific examples of the conductive aid include, but are not limited to, carbon materials such as vapor-grown carbon fiber (VGCF), acetylene black (AB), Ketjen black (KB), carbon nanotube (CNT), and carbon nanofiber (CNF), and metal materials capable of withstanding the environment when used in a battery. One type of conductive aid may be used alone, or two or more types may be mixed and used.

1.5.3 Binder

Specific examples of the binder include, but are not limited to, acrylonitrile butadiene rubber (ABR)-based binders, butadiene rubber (BR)-based binders, polyvinylidene fluoride (PVdF)-based binders, styrene-butadiene rubber (SBR)-based binders, polytetrafluoroethylene (PTFE)-based binders, and polyimide (PI)-based binders. One type of binder may be used alone, or two or more types may be mixed and used.

2. Production Method of Electrode

The electrode mixture produced by the method of the present disclosure can be used, for example, as a material constituting the electrodes of various batteries. In this regard, the technique of the present disclosure has an aspect as a method for producing an electrode. For example, the method for producing an electrode of the present disclosure may comprise obtaining an electrode mixture by the method of the present disclosure, and molding the electrode mixture to obtain an electrode comprising a layer composed of the electrode mixture (molding step).

In the molding step, the electrode mixture may be dry-molded or wet-molded. The electrode mixture may be molded by itself or together with a current collector. Further, the electrode mixture may be molded integrally on the surface of the electrolyte layer. Examples of the molding step include an aspect in which an electrode is produced through a process of applying a slurry containing the electrode mixture onto a surface of a current collector and subsequently drying and optionally pressing, or an aspect in which an electrode is produced by charging the electrode mixture in powder form into a die and dry press molding the powder. An example of a configuration of the electrode will be described later.

3. Production Method of Lithium-Ion Cell

The technique of the present disclosure also has an aspect as a method for producing a lithium-ion battery. That is, the method for producing a lithium-ion battery of the present disclosure may comprise obtaining an electrode by the method for producing an electrode of the present disclosure described above, and obtaining a laminate body comprising the electrode and an electrolyte layer.

When producing a solid-state battery as a lithium-ion battery, the electrolyte layer may be, for example, a layer containing a solid electrolyte and a binder. The types of solid electrolytes and binders are as described above. Alternatively, when producing an liquid electrolyte battery as a lithium-ion battery, the electrolyte layer may be, for example, a layer comprising a separator and an electrolyte solution. For the separator and the electrolyte solution, publicly known ones may be adopted. The lithium-ion battery may be produced through obvious steps such as laminating an electrode and an electrolyte layer, connecting terminals to the electrode, housing the battery in a battery case, and restraining the battery. An example of a configuration of the lithium-ion battery will be described later.

4. Electrode Mixture

The technique of the present disclosure has an aspect as an electrode mixture itself. Specifically, the electrode mixture of the present disclosure contains at least a first particle and a second particle, wherein the first particle has an active material and a coating layer covering at least a portion of the surface of the active material, and wherein the second particle is free of the active material and contains the same component as that constituting the coating layer. The first particle, the second particle, and any additional component contained in the electrode mixture are as described above. For example, in the electrode mixture of the present disclosure, the roundness of the cross-section of the second particle may be 0.30 or greater or 0.35 or greater, and may be 1.00 or less or 0.85 or less. Further, as described above, in the electrode mixture of the present disclosure, the coating layer may contain at least lithium and niobium as constituent elements. Furthermore, as described above, the electrode mixture of the present disclosure may contain at least the first particle, the second particle, and a solid electrolyte.

5. Electrode

Figure 6:
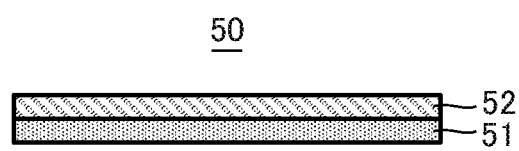
FIG. 6 schematically shows an example of the configuration of an electrode.

The technique of the present disclosure also has an aspect as an electrode itself. Specifically, the electrode of the present disclosure comprises a layer composed of the above electrode mixture (electrode mixture layer). As shown in FIG. 6, the electrode 50 according to one embodiment may be provided with, in addition to an electrode mixture layer 51, a current collector 52 in contact with the electrode mixture layer 51. The electrode may be a positive electrode or a negative electrode. Particularly, when used as a positive electrode (in particular, a positive electrode for lithium-ion battery), a greater effect due to the technique of the present disclosure can be expected.

5.1 Electrode Mixture Layer

As described above, the electrode mixture layer is obtained by molding the electrode mixture. The shape of the electrode mixture layer is not particularly limited, and may be appropriately determined according to the shape of the electrode. For example, the electrode mixture layer may be a substantially flat sheet. The thickness thereof may be, for example, 1 μm or more, 10 μm or more, or 30 μm or more, and may be 1 mm or less, 500 μm or less, or 100 μm or less.

In the electrode of the present disclosure, when the cross-section of the electrode mixture layer is observed, the second particle ratio may account for 0.02% by area or more or 0.03% by area or more of the electrode mixture layer. Consequently, granulation and agglomeration of the first particles are more easily suppressed, and the performance of the electrode may be further improved. The upper limit of the second particle ratio accounting for the electrode mixture layer is not particularly limited. The upper limit may be, for example, 3.00% by area or less, 2.00% by area or less, or 1.00% by area or less.

The shape and size of the second particle contained in the electrode mixture layer can be quantified by acquiring SEM images (for example, total number of pixels=1024×700) of the electrode cross-section and carrying out image analysis. Specifically, the SEM images of the electrode cross-section are compared with EDX mapping images to extract the second particle contained in the cross-section. The target element for EDX mapping may be appropriately selected in accordance with the element contained in the active material and the element contained in the coating layer. In order to remove fine noise, those having a predetermined number of pixels or less (for example, 50 pixels or less) may be excluded from the extraction target. The number of extracted second particles, the average particle diameter, the area taken by the second particles, and the roundness (circularity) are determined. For the average particle diameter, each particle is approximated as a circle, and the diameters (equivalent circular diameters) of the circles are used to obtain an average value as the particle diameter. The area taken by the second particles in the electrode mixture layer is determined by the number of pixels of each particle using the following formula (I). The roundness (circularity) of the second particle is determined by an elliptical approximation of each particle using the following formula (II).

(Area taken by second particles)=(number of pixels of each particle contained in electrolyte mixture layer in SEM image)/(total number of pixels of electrode mixture layer in SEM image)    (I)

(Roundness)=[4×(particle area)]/[π×(main axis length)$^2$]    (II)

5.2 Current Collector

For the current collector, any general current collector for batteries can be adopted. The current collector may be foil-like, plate-like, mesh-like, in a perforated (punched) metal form, or a foam body. The current collector may be a metal foil or a metal mesh, or may be a carbon sheet. Particularly, the metal foil has handleability. The current collector may be formed of a plurality of foils or sheets. Examples of the metal constituting the current collector include Cu, Ni, Cr, Au, Pt, Ag, Al, Fe, Ti, Zn, Co, and stainless steel. The current collector may have some coating layer for the purpose of adjusting resistance on the surface thereof. In addition, the current collector may be formed of the above metal plated or vapor-deposited on a metal foil or a substrate. When the current collector is formed of a plurality of metal foils, some layer may be present between the plurality of metal foils. The thickness of the current collector is not particularly limited. The thickness may be, for example, 0.1 μm or more or 1 μm or more, and may be 1 mm or less or 100 μm or less.

6. Lithium-Ion Battery

Figure 7:
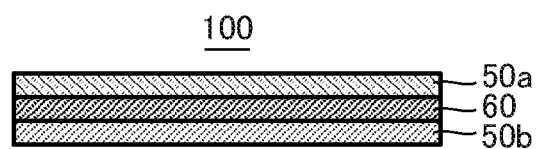
FIG. 7 schematically shows an example of the configuration of a lithium-ion battery.

The technique of the present disclosure also has an aspect as a lithium-ion battery itself. Specifically, the lithium-ion battery of the present disclosure comprises the electrode described above. The lithium-ion battery can be provided with a configuration which is obvious for batteries, together with the above electrode. For example, as shown in FIG. 7, the lithium-ion battery 100 may comprise a positive electrode 50a, a negative electrode 50b, and the above electrolyte layer 60. In the lithium-ion battery of the present disclosure, at least one of the positive electrode 50a and the negative electrode 50b may be the electrode 50 of the present disclosure. Particularly, when the electrode 50 of the present disclosure is provided as the positive electrode 50a in the lithium-ion battery, a greater effect due to the technique of the present disclosure can be expected. The electrolyte layer is as described above.

EXAMPLES

Hereinafter, the technique of the present disclosure will be described with reference to the Examples. However, the technique of the present disclosure is not limited thereto.

1. Examples 1 to 8

1.1 Preparation of Nb-Containing Coating Liquid 987.4 g of ion-exchanged water and 44.2 g of niobic acid ($Nb_2O_5 \cdot 3H_2O$ ($Nb_2O_5$ moisture content at 72%)) were added into a container containing 870.4 g of a hydrogen peroxide solution having a concentration of 30% by mass. 87.9 g of aqueous ammonia having a concentration of 28% by mass was then added into the above container. After the aqueous ammonia was added, the contents in the container were sufficiently stirred to obtain a transparent solution. 10.1 g of lithium hydroxide monohydrate ($LiOH \cdot H_2O$) was further added into the obtained transparent solution to obtain a complex solution containing a niobium peroxo complex and lithium ions as a coating liquid.

1.2 Preparation of Slurry Containing Active Material and Coating Liquid 20 g of $LiNi_{1/3}Mn_{1/3}Co_{1/3}O_2$ (manufactured by Nichia Corporation) as an active material was charged into a mixer container and added into the coating liquid adjusted as described above so as to achieve a predetermined solid content concentration. The mixture was then stirred with a magnetic stirrer. The solid content concentration of the active material in the coating liquid of each Example is shown in Table 1 below.

1.3 Production of Precursors

Using a liquid feed pump, the slurry of each Example prepared as described above was supplied to a spray dryer (Mini Spray Dryer B-290 manufactured by BUCHI Corporation) at a predetermined liquid feed speed, and slurry dropletization (step S1) and gas-flow drying (step S2) of the slurry droplets were carried out to obtain the first precursor and the second precursor. The gas supply temperature, gas supply volume, and liquid feed speed of the spray dryer are as indicated in Table 1.

The time required for feeding the slurry to the nozzle of the spray dryer and dropletizing the slurry (dropletization treatment time in the step S1) and the time required for gas-flow drying time (gas-flow drying treatment time in the step S2) in each Example were each a short time of less than 1 min. It should be noted that the gas-flow drying treatment time means the time from the end of the supply of the slurry to the spray nozzle to the end of gas-flow drying.

1.4 Firing of Precursors

The first precursor and the second precursor were fired at 200° C. for 5 h using a muffle furnace. In the first precursor, lithium niobate was synthesized on the active material surface to obtain a first particle, which is a coated active material. Simultaneously, the second precursor was fired to obtain a second particle containing lithium niobate.

2. Example 9

Except that a P-containing coating liquid was used in place of the above Nb-containing coating liquid, the preparation of the slurry, the production of the precursors, and the firing of the precursors were carried out in the same manner as in Example 8.

The P-containing coating liquid was prepared as described below. Specifically, 866.6 g of ion-exchanged water was added into a container containing 59.8 g of phosphoric acid having a concentration of 85% by mass, and the mixture was sufficiently stirred to obtain a transparent solution. 70.2 g of lithium hydroxide monohydrate ($LiOH \cdot H_2O$) was added into the obtained transparent solution to obtain an aqueous solution containing phosphate ions and lithium ions as a coating liquid.

3. Comparative Examples 1 and 2

Using a tumbling fluidized-bed granulating-coating apparatus, a coated active material was obtained under the conditions indicated below.

3.1 Comparative Example 1

Figure 8:
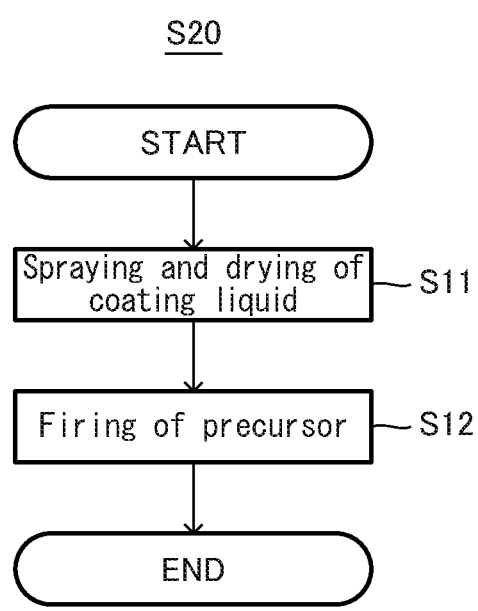
FIG. 8 shows the flow of a production method according to the Comparative Examples.

As shown in method S20 of FIG. 8, 2000 g of the Nb-containing coating liquid prepared as described above was sprayed onto 1 kg of $LiNi_{1/3}Mn_{1/3}Co_{1/3}O_2$ (manufactured by Nichia Corporation) as an active material and dried to obtain a precursor of the coated active material (S11) using a tumbling fluidized-bed granulating-coating apparatus "MP-01" (manufactured by Powrex Corporation). The obtained precursor was then fired under the same condition as in the Examples described above (S12) to obtain a coated active material according to Comparative Example 1.

The operating conditions of the tumbling fluidized-bed granulating-coating apparatus are as described below.

Atmospheric gas: dry air with a dew point of −65° C. or lower
Gas supply temperature: 200° C.
Gas supply volume: 0.45 m³/min
Rotor rotational speed: 400 rpm
Spray rate: 4.4 g/min

3.2 Comparative Example 2

Except that a P-containing coating liquid was used in place of the Nb-containing coating liquid, the coated active material was obtained in the same manner as in Comparative Example 1.

4. Evaluation Conditions 4.1 Particle Diameter and Particle Distribution Measurements Particle diameters (D10, D50, D90, and D99) at integrated values of 10%, 50%, 90%, and 99% in a volume-based particle diameter distribution of the positive electrode active material before coating in each Example and Comparative Example were measured using a laser diffraction/scattering measuring apparatus (Aerotrac II manufactured by MicrotracBEL Corp.). In addition, the particle diameters (D10, D50, D90, and D99) of the particles (first particle and second particle) obtained after firing in each Example and Comparative Example were measured in the same manner. The ratio of particle diameter of the first and second particles after firing to the particle diameter of the positive electrode active material before coating (particle diameter after firing/particle diameter before coating) for each of the particle diameters D10, D50, D90, and D99 was calculated, and the results are shown in Table 1 below.

4.2 Evaluations of Electrode and Battery 4.2.1 Production of Positive Electrode

The particles after firing in each Example and Comparative Example and a sulfide solid electrolyte ($10LiI-15LiBr-37.5Li_3PS_4$) were weighed so as to achieve a volume ratio of 6:4 and charged into heptane together with vapor-grown carbon fibers (VGCFs) (manufactured by Showa Denko K.K.) as a 3% by mass conductive aid and butadiene rubber (manufactured by JSR Corporation) as a 0.7% by mass binder. These were then mixed to produce a positive electrode mixture. The produced positive electrode mixture was sufficiently dispersed with an ultrasonic homogenizer, then applied onto an aluminum foil and dried at 100° C. for 30 min, and subsequently punched to a size of 1 cm² to obtain a positive electrode according to each Example and Comparative Example.

The cross-section of the obtained positive electrode was observed, and the area ratio of the second particle to the positive electrode mixture layer was measured. The area ratio of the second particle was measured by image analysis using the SEM images and EDX mapping images described above. The results are shown in Table 1 below.

4.2.2 Production of Negative Electrode

A negative electrode active material (layered carbon) and a sulfide solid electrolyte ($10LiI-15LiBr-37.5Li_3P_4$) were prepared so as to achieve a volume ratio of 6:4 and charged into heptane together with butadiene rubber (manufactured by JSR Corporation) as a 1.2% by mass binder. These were then mixed to produce a negative electrode mixture. The produced negative electrode mixture was sufficiently dispersed with an ultrasonic homogenizer, then applied onto a copper foil and dried at 100° C. for 30 min, and subsequently punched to a size of 1 cm² to obtain a negative electrode.

4.2.3 Production of Solid Electrolyte Layer 64.8 mg of a sulfide solid electrolyte ($10LiI-15LiBr-37.5Li_3PS_4$) was added into a ceramic cylinder having an inner diameter cross-sectional area of 1 cm², smoothed, and then pressed at 1 ton to form a solid electrolyte layer.

4.2.4 Production of Battery

The positive electrode produced as described above was overlaid on one surface of the solid electrolyte layer, the negative electrode produced as described above was overlaid on the other surface thereof, and the electrodes were pressed at 4.3 tons for 1 min. Stainless steel rods were then placed on both electrodes and restrained at 1 ton to obtain a lithium-ion battery according to each Example and Comparative Example.

4.2.5 Resistance Measurement

The resistance in 5 s at 40% SOC of the lithium-ion battery obtained as described above was measured. It should be noted that the resistance of each of the batteries according to Examples 1 to 8 was relativized using the resistance of the battery according to Comparative Example 1 as a reference (100) and evaluated, and the resistance of the battery according to Example 9 was relativized using the resistance of the battery according to Comparative Example 2 as a reference (100) and evaluated.

4.2.6 Output Measurement

For the lithium-ion battery of each Example and Comparative Example, the open-circuit voltage (OCV) was adjusted to 3.66 V, constant power charging was then carried out, and the maximum power that could be discharged in 5 s was measured as the output of the battery. It should be noted that the cutoff voltage was 2.5 V. The output of each of the batteries according to Examples 1 to 8 was relativized using the output of the battery according to Comparative Example 1 as a reference (100) and evaluated. Further, the output of the battery according to Example 9 was relativized using the output of the battery according to Comparative Example 2 as a reference (100) and evaluated.

5. Evaluation Results

The evaluation results are shown in Table 1. It should be noted that in Table 1, "total treatment time" means the sum of the "slurry dropletization treatment time (spray time)" and the "gas-flow treatment time" in the Examples, and means the total time of the treatment for spraying while drying the coating liquid onto the active material in the Comparative Examples. "Total treatment rate" is a value obtained by dividing the amount of active material used by the total treatment time.

TABLE 1

|  | Gas supply temperature (° C.) | Gas supply volume (m3/min) | Solid content concentration (vol %) | Liquid feed rate (g/sec) | Particle diameter after firing/particle diameter before coating | | | | Total treatment time (min) | Total treatment rate (g/min) | Area ratio of second particle (%) | Resistance | Output |
|---|---|---|---|---|---|---|---|---|---|---|---|---|---|
|  |  |  |  |  | D10 | D50 | D90 | D99 |  |  |  |  |  |
| Comparative Example 1 | 200 | — | — | — | 0.78 | 1.01 | 1.23 | 1.24 | 444 | 2.3 | 0 | 100 | 100 |
| Example 1 | 200 | 0.45 | 15.3 | 0.5 | 0.80 | 1.09 | 1.29 | 1.39 | <2 | >10 | 0.011 | 99.9 | 100 |
| Example 2 | 200 | 0.45 | 9.2 | 0.5 | 0.77 | 1.11 | 1.30 | 1.36 | <2 | >10 | — | 99.9 | 100 |
| Example 3 | 200 | 0.45 | 6.4 | 0.5 | 0.75 | 1.09 | 1.29 | 1.37 | <2 | >10 | — | 99.7 | 100 |
| Example 4 | 200 | 0.80 | 15.3 | 0.5 | 0.81 | 1.08 | 1.33 | 1.39 | <2 | >10 | 0.033 | 99.9 | 100 |
| Example 5 | 220 | 0.80 | 15.3 | 0.5 | 0.80 | 1.05 | 1.29 | 1.32 | <2 | >10 | 0.029 | 99.1 | 101 |
| Example 6 | 250 | 0.80 | 15.3 | 0.5 | 0.77 | 1.00 | 1.21 | 1.22 | <2 | >10 | 0.035 | 98.1 | 102 |
| Example 7 | 250 | 0.80 | 15.3 | 1.0 | 0.80 | 1.04 | 1.26 | 1.26 | <2 | >10 | 0.098 | 97.4 | 103 |
| Example 8 | 250 | 0.80 | 15.3 | 2.0 | 0.65 | 0.92 | 1.12 | 1.12 | <2 | >10 | 0.688 | 85.2 | 117 |
| Comparative Example 2 | 200 | — | — | — | — | 5.79 | — | — | 444 | 2.3 | — | 100 | 100 |
| Example 9 | 250 | 0.80 | 15.3 | 2.0 | 0.79 | 1.02 | 1.22 | 1.23 | <2 | >10 | 0.319 | 25.8 | 391 |

In tumbling fluidized-bed coating, when the spray rate of the coating liquid is high, granules are generated due to liquid crosslinking. In addition, in tumbling fluidized-bed coating, the action of deagglomerating particles during drying is weak, and once granules are generated, it is difficult to crush the granules. Therefore, in tumbling fluidized-bed coating, the spray speed must be reduced in order to avoid the granulation of particles. In the prior art as in, for example, the Comparative Examples, 2000 g of coating liquid is fed at 4.4 g/min and the liquid feed time reaches 444 min, whereas it was found that according to the Examples, the coated active material can be produced in a shorter time than in the Comparative Examples. In the Examples, by the presence of the first precursor and the first particle together with the second precursor and the second particle, agglomeration and granulation of the first precursors and the first particles are suppressed. Further, when granules of the first precursor are generated, the granules can be crushed by gas-flow drying. Therefore, a slurry having a low solid content concentration can be used, and the treatment speed is easily increased. That is, the slurry can be treated at a higher speed than under the conditions shown in Table 1.

It was found that the resistance and output of each of the lithium-ion batteries using the first particle and the second particle produced in the Examples are the same as or superior to the resistance and output of each of the lithium-ion batteries using the coated active material produced in the Comparative Examples. Particularly, when the gas supply temperature (temperature of the heating gas) was at a high temperature of 250° C. or higher (Examples 6 to 8), in particular, when the gas supply temperature was at a high temperature of 250° C. or higher and the liquid feed speed was at a high speed of 1.0 g/sec or more (Examples 7 and 8), a large amount of the second particles was generated and granulation of the first particles was suppressed. As a result, it was found that the resistance of the lithium-ion battery was remarkably reduced and the output was remarkably improved. It is considered that the suppression of granulation of the first particles allows battery reactions by the active material to occur more efficiently, whereby the resistance of the electrodes and the battery is reduced.

From the results of Examples 1 to 9 and Comparative Examples 1 and 2, it was found that the technique of the present disclosure demonstrates the desired effect regardless of the type of coating liquid. However, according to the findings of the present inventors, when the P-containing coating liquid is used, the active material excessively granulates during tumbling fluidized-bed coating, whereby even when the spray rate is set to a low rate as described above, it is difficult to properly coat the surface of the active material. Further, a coating layer formed by the P-containing coating liquid initially has higher resistance compared to a coating layer formed by the Nb-containing coating liquid. As a result, the output of the battery is reduced. Specifically, the batteries of Examples 1 to 8 had lower resistance and higher output than the battery of Example 9, in the ranges verified in the Examples.

From the results of Examples 1 to 3, even when the solid content concentration of the slurry was changed, there was not much difference in the granulation suppressing effect of the active material. In addition, from the results of Examples 1 and 4, even when the gas supply volume during spray drying was changed, there was not much difference in the granulation suppressing effect of the active material. When all of Examples 1 to 8 were compared, the higher the gas supply temperature (temperature of the heating gas), in particular, the higher the gas supply temperature and the higher the liquid feed speed, the higher the granulation suppressing effect of the active material tended to be. Whether or not a surface of the active material is coated is considered to vary significantly depending on the surface energy of the coating liquid. Since the surface energy of the coating liquid is strongly influenced by temperature, it is considered that the sensitivity of the gas supply temperature is increased.

In Table 1, the particle diameter ratio for the particle diameter D10 was less than 1.00 (smaller after firing than before coating), presumably because the agglomeration of the active material before coating was eliminated by tumbling fluidized-bed coating and spray drying. That is, it is considered that the agglomeration of the active material before coating has a weaker binding force within the active material than the granulation via the coating liquid, and thus the active material before coating can be easily crushed. The presence of the second particles in the Examples is considered to be negligible and have almost no influence on the particle diameter D10. On the other hand, the particle diameters D50 to D99 are larger after firing than those before coating. This is considered to be an effect of the enlargement of the active material particles being covered by the coating liquid and an effect of the active material being granulated via the coating liquid. As shown in Table 1, it was found that the method according to the Examples can suppress granulation to the same extent as the method according to the Comparative Examples and accelerate the production steps as compared to the method according to the Comparative Examples.

REFERENCE SIGNS LIST 10 slurry droplet
10a active material
10b coating liquid
10c component from coating liquid
10d coating layer
21 first precursor
22 second precursor
31 first particle (coated active material)
32 second particle
50 electrode
50a positive electrode
50b negative electrode
51 electrode mixture layer
52 current collector
60 electrolyte layer
100 lithium-ion battery

The invention claimed is:

1. A method for producing an electrode mixture, comprising:
    dropletizing a slurry containing an active material and a coating liquid to obtain slurry droplets;
    gas-flow drying the slurry droplets in a heating gas to obtain a first precursor and a second precursor; and
    firing the first precursor and the second precursor to obtain a first particle and a second particle, wherein
    the first precursor contains the active material and a component from the coating liquid,
    the second precursor is free of the active material and contains a component from the coating liquid,
    the first particle has the active material and a coating layer covering at least a portion of a surface of the active material, and
    the second particle is free of the active material and contains a component same as that constituting the coating layer.

2. The method according to claim 1, wherein the heating gas has a temperature of 250° C. or higher.

3. The method according to claim 1, wherein the slurry droplets are obtained by spraying the slurry.

4. The method according to claim 1, wherein the coating liquid contains at least a lithium source and a niobium source.

5. The method according to claim 4, wherein the coating liquid contains a niobium peroxo complex as the niobium source.

6. The method according to claim 1, comprising mixing at least the first particle, the second particle, and a solid electrolyte.

* * * * *